(12) United States Patent
Sowards et al.

(10) Patent No.: US 9,670,824 B2
(45) Date of Patent: *Jun. 6, 2017

(54) ACTIVE GRILLE SHUTTER SYSTEM WITH A STAGED PROGRESSIVE LINKAGE TO REDUCE ENGINE MISFIRE FROM CHARGE AIR COOLER CONDENSATION

(71) Applicant: Ford Global Technologies, LLC, Dearborn, MI (US)

(72) Inventors: John Sowards, Chesterfield, MI (US); Jim Raymond Palm, Ypsilanti, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 678 days.

This patent is subject to a terminal disclaimer.

(21) Appl. No.: 13/857,365

(22) Filed: Apr. 5, 2013

(65) Prior Publication Data

US 2014/0299077 A1 Oct. 9, 2014

(51) Int. Cl.
*F01P 7/02* (2006.01)
*F01P 7/10* (2006.01)
*B60K 11/08* (2006.01)
*F01P 7/12* (2006.01)
*F01P 7/16* (2006.01)

(52) U.S. Cl.
CPC .............. *F01P 7/10* (2013.01); *B60K 11/085* (2013.01); *F01P 7/12* (2013.01); *F01P 7/026* (2013.01); *F01P 7/16* (2013.01)

(58) Field of Classification Search
CPC ...... F01P 7/12; F01P 7/10; F01P 7/026; F01P 7/16; B60K 11/085
USPC ........................................................ 123/41.05
See application file for complete search history.

(56) References Cited

U.S. PATENT DOCUMENTS

| 5,429,411 | A | * | 7/1995 | Spears | ................ | B62D 35/001 |
|---|---|---|---|---|---|---|
| | | | | | | 296/180.1 |
| 6,015,342 | A | * | 1/2000 | Dennis | .................. | F24F 1/0011 |
| | | | | | | 454/155 |
| 8,161,919 | B2 | | 4/2012 | Klotz et al. | | |
| 2005/0109483 | A1 | * | 5/2005 | Kolb | ................ | 165/41 |
| 2009/0199672 | A1 | * | 8/2009 | Impellizeri | ................ | 74/473.21 |
| 2010/0147611 | A1 | * | 6/2010 | Amano | ................ | B60K 11/085 |
| | | | | | | 180/68.1 |
| 2011/0246023 | A1 | | 10/2011 | Lockwood et al. | | |
| 2012/0060776 | A1 | * | 3/2012 | Charnesky et al. | ....... | 123/41.05 |
| 2012/0090906 | A1 | | 4/2012 | Charnesky et al. | | |

* cited by examiner

*Primary Examiner* — Hung Q Nguyen
*Assistant Examiner* — Charles Brauch
(74) *Attorney, Agent, or Firm* — Julia Voutyras; McCoy Russell LLP

(57) ABSTRACT

Methods and systems are provided for adjusting a dual grille shutter system based on engine operating conditions. A position of a first group of grille shutters may be adjusted by a motor in response to engine temperature, CAC temperature, and driving conditions. A position of a second group of grille shutters may be adjusted based on the position of the first group of grille shutters.

19 Claims, 5 Drawing Sheets

ACTIVE GRILLE SHUTTER SYSTEM WITH A STAGED PROGRESSIVE LINKAGE TO REDUCE ENGINE MISFIRE FROM CHARGE AIR COOLER CONDENSATION

BACKGROUND/SUMMARY

Turbo charged engines utilize a Charge Air Cooler (CAC) to cool compressed air from the turbocharger, before it enters the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. Condensate may collect at the bottom of the CAC, and then be drawn into the engine at once during acceleration (or tip-in) increasing the chance of engine misfire.

A multi active grille shutter system, for example a dual grill system, located at a front end of a vehicle may control ambient airflow to the engine components. An upper group of grille shutters may control airflow to a radiator while a lower group of grille shutters may control airflow to the charge air cooler. In one example, the upper and lower groups of grille shutters may be actuated together with a single motor. However, actuating the upper and lower groups of grille shutters together may not allow for both increased engine cooling (e.g., radiator cooling) and decreased CAC cooling depending on operating conditions.

Other attempts to address condensate formation in a CAC include controlling the lower group of grille shutters separately from the upper group of grille shutters. In this way, cooling to the CAC may be reduced while maintaining adequate engine cooling. In one example, individual control of the upper and lower groups of grille shutters may be achieved with two motors, each motor controlling one group of grille shutters. However, the inventors herein have recognized potential issues with such systems. As one example, two motors may require more complicated control routines and increased engine system components.

In one example, the seemingly paradoxical issues described above may be addressed by a method for adjusting a multi-grille shutter system with a single motor, the motor coupled only to an upper group of grille shutters. Specifically, a lower group of grille shutters may be coupled to the upper group of grille shutters through a staged linkage. The staged linkage may allow delayed opening of the lower group of grille shutters, depending on the amount of opening of the upper group of grille shutters. For example, if the upper group of grille shutters is opened less than a threshold amount, the lower group of grille shutters may remain closed. Alternatively, if the upper group of grille shutters is opened more than a threshold amount, the lower group of grille shutters opens proportionally with the upper group of grille shutters.

As one example, the multi-grille shutters system may be adjusted in response to engine operating conditions. Engine operating conditions may include engine temperature, CAC temperature, and driving conditions. In one example, only the upper group of grille shutters may be adjusted while the lower group of grille shutters remains closed in response to an engine temperature greater than a first threshold temperature when a CAC temperature is less than a threshold temperature. In another example, the upper and lower groups of grille shutters may be proportionally adjusted in response to the engine temperature greater than a first threshold temperature when the CAC temperature is greater than the threshold temperature. In this way, adequate engine cooling may be provided while reducing condensate formation and engine misfire events.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
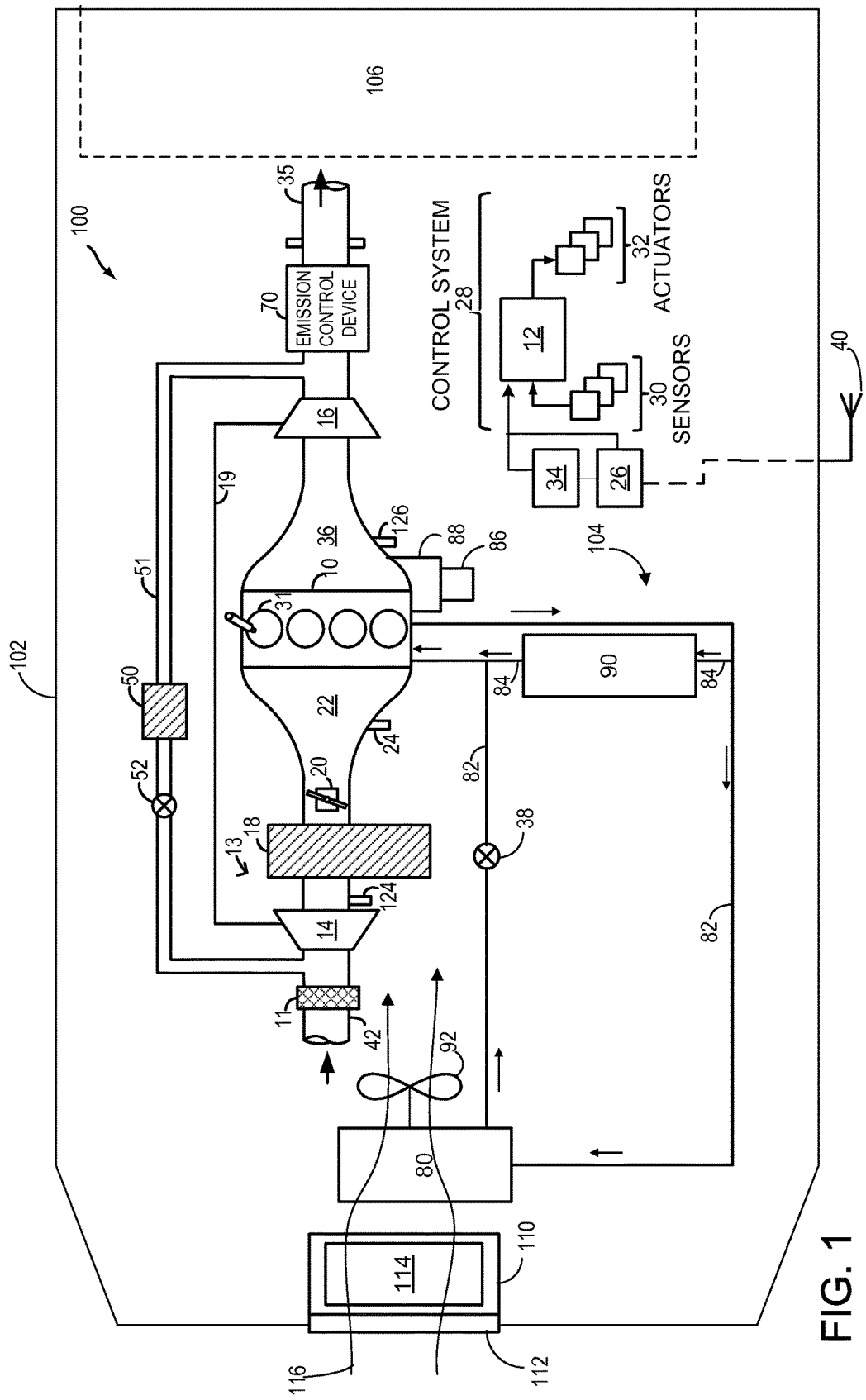
FIG. 1 shows a schematic diagram of a grille shutter system, engine, and associated components in a vehicle.
Figure 3:
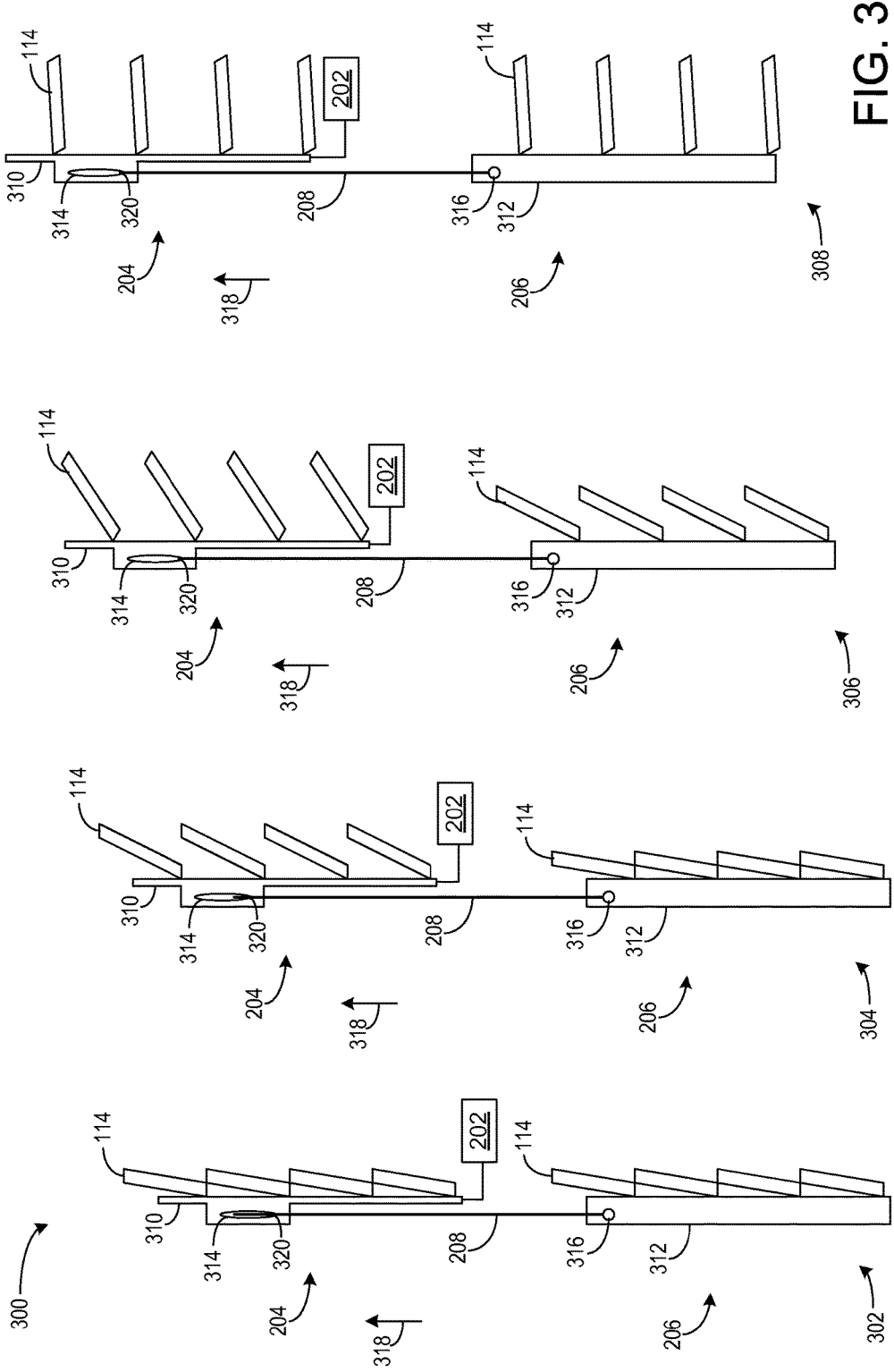
FIG. 3 shows a schematic example of a grille shutter system comprising upper and lower grille shutters.
Figure 4:
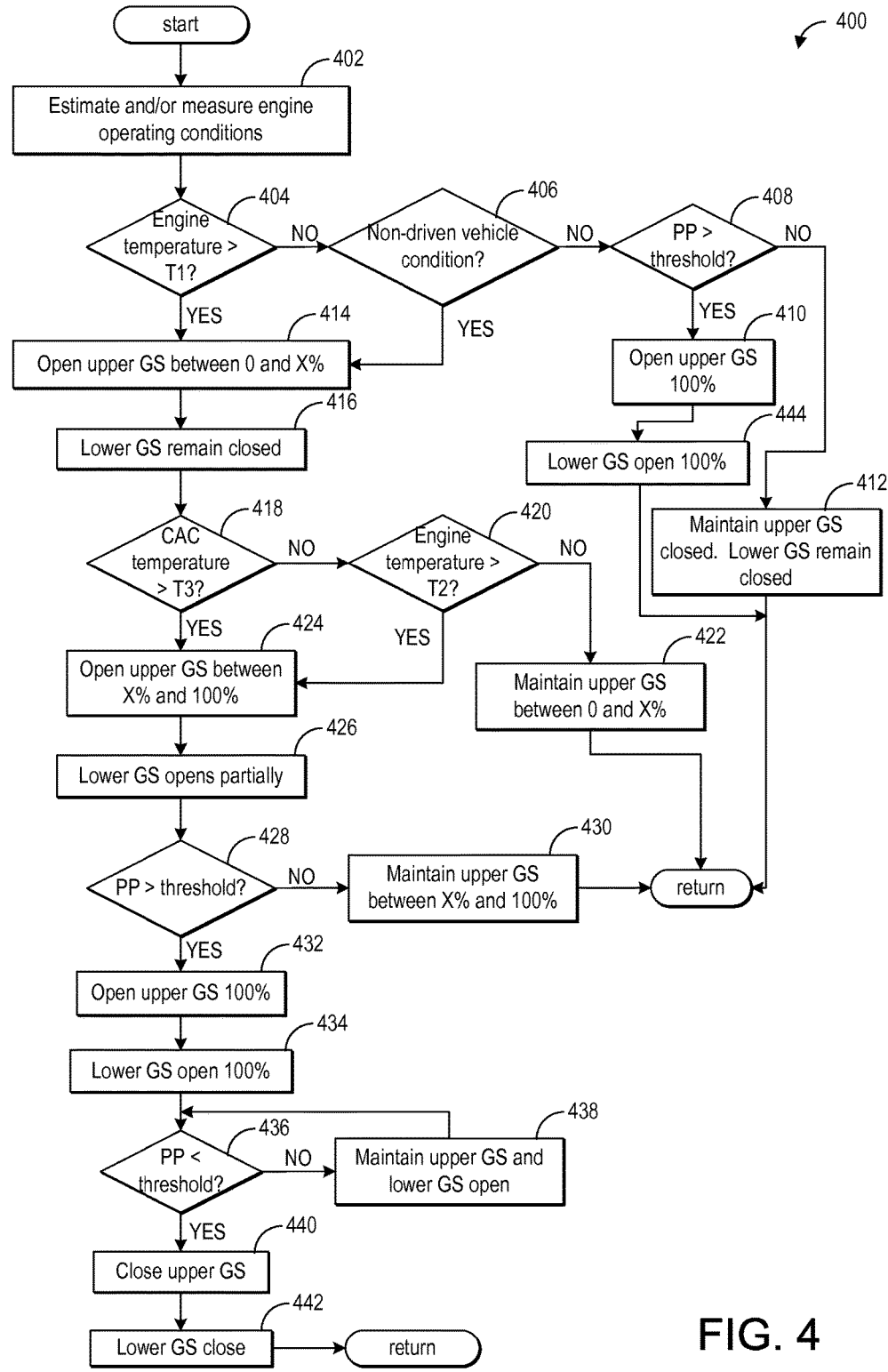
FIG. 4 shows an example of a method for adjusting a dual grille shutter system in response to engine operating conditions.

The following description relates to systems and methods for adjusting a multi-grille (e.g., dual grill) shutter system to control ambient airflow to engine components of an engine system, such as the engine system shown in FIG. 1. The dual grille shutter system, such as the system shown in FIG. 2, may comprise a first group of grille shutters and a second group of grille shutters located at a front end of a vehicle. The first group of grille shutters may be positioned above and mechanically linked to the second group of grille shutters through a slotted linkage. A single motor may actuate the first group of grille shutters while movement of the first group of grille shutters may control movement of the second group of grille shutters. The opening of the second group of grille shutters may be delayed with respect to the opening of the first group of grille shutters by the slotted linkage. FIG. 3 illustrates this relationship between the first group of grille shutters and the second group of grille shutters. An amount of opening of the first group of grille shutters may control an amount of ambient airflow to a radiator while an amount of opening of the second group of grille shutters may control an amount of ambient airflow to a CAC. As such, a method for adjusting the opening of the first and second group of grille shutters, based on engine operating conditions, is shown at FIG. 4. Finally, example adjustments to the dual grille shutter system in response to engine operating conditions are presented at FIG. 5.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient airflow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. Thus, as elaborated herein with reference to FIGS. 3-5, cooling ambient airflow traveling to the CAC may be controlled by the grille shutter system 110 such that condensate formation and engine misfire events are reduced.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance. In other embodiments, the EGR system may be a high pressure EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12 described in more detail hereafter. In one example, the engine cooling fan may also direct cooling airflow toward CAC 18. Alternatively, electric fan 92 may be coupled to the engine accessory drive system, driven by the engine crankshaft. In other embodiments, electric fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from a GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate engine operating parameter adjustments. In one example, these adjustments may include adjusting the grille shutter system 110. For example, if humidity is greater than a defined threshold, one or more of the grille shutters may be closed.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as electric fan 92 and/or grille shutter system 110.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving ambient airflow 116 through or near the front end of the vehicle and into the engine compartment. Such ambient airflow 116 may then be utilized by radiator 80, electric fan 92, and other components to keep the engine and/or transmission cool. Further, the ambient airflow 116 may reject heat from the vehicle air conditioning system and can improve performance of turbo-charged/super-charged engines that are equipped with CAC 18 that reduces the temperature of the air that goes into the intake manifold/engine. In one example, the electric fan 92 may be adjusted to further increase or decrease the airflow to the engine components. In another example, a dedicated CAC fan may be included in the engine system and used to increase or decrease airflow to the CAC.

Figure 2:
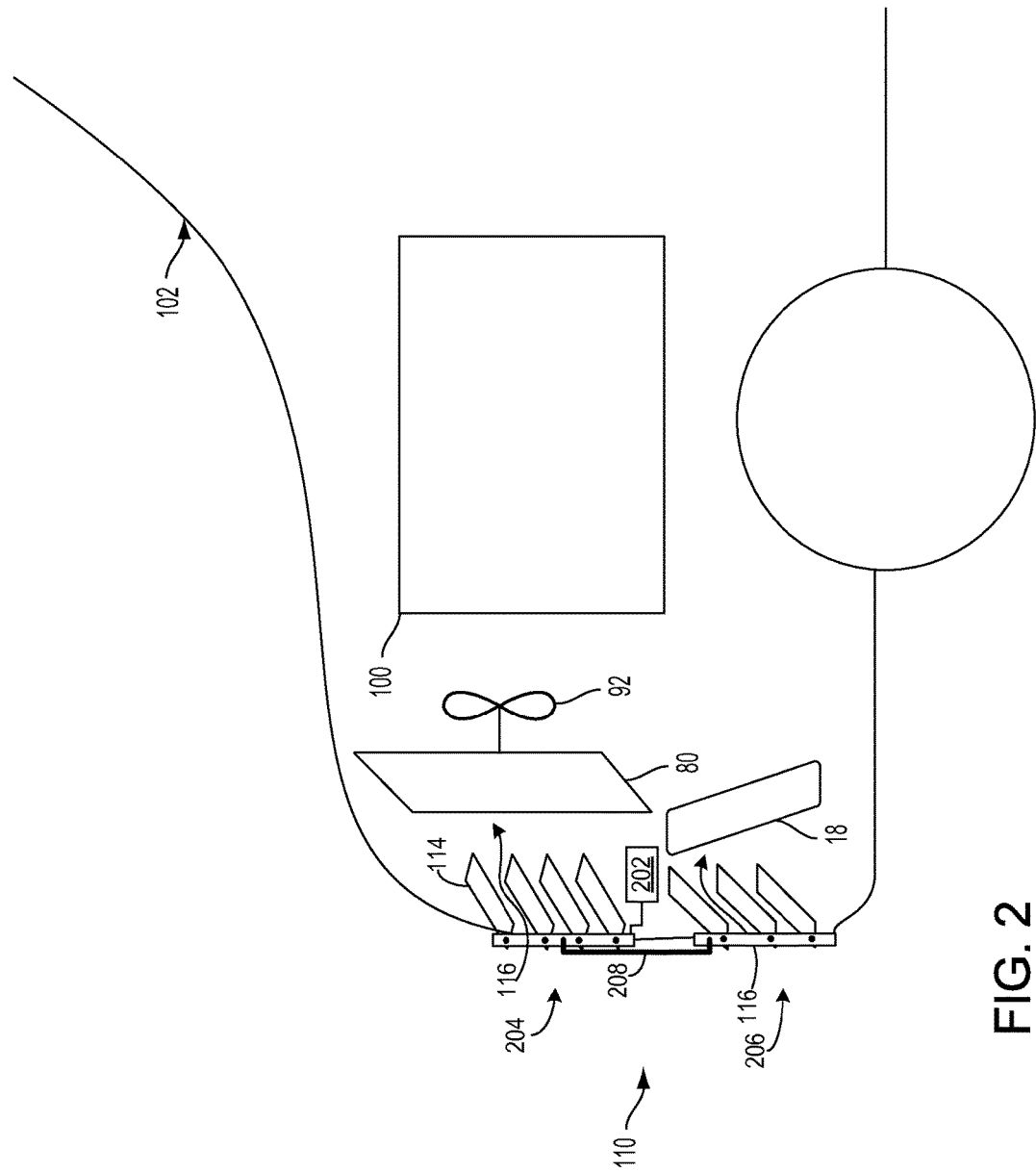
FIG. 2 shows an example of a CAC, radiator, and engine location within a vehicle with respect to the grille shutters and associated ambient airflow.

FIG. 2 shows an example of the CAC 18, radiator 80, electric fan 92, and engine system 100 locations within a vehicle 102 with respect to the grille shutter system 110 and associated ambient airflow 116. Other under hood components (fuel system, batteries, etc.) may benefit from the cooling airflow as well. Thus, grille shutter system 110 and electric fan 92 may assist cooling system 104 in cooling internal combustion engine 10. Grille shutter system 110 may be a dual active grille shutter system comprising two groups of one or more grille shutters 114 configured to adjust the amount of airflow received through grille 112.

Grille shutters 114 may cover a front region of the vehicle spanning from just below the hood to the bottom of the bumper, for example. By covering the vehicle front end, drag is reduced and entry of external cooling air into the CAC is reduced. A first group of grille shutters 204 may be positioned in front of the radiator 80 and a second group of grille shutters 206 may be positioned in front of the CAC 18.

As shown in FIG. 2, the first group of grille shutters 204 is positioned vertically above, with respect to a surface on which vehicle 102 sits, the second group of grille shutters 206. As such, the first group of grille shutters 204 may be referred to as the upper grille shutters and the second group of grille shutters 206 may be referred to as the lower grille shutters. An amount of opening of the first group of grille shutters 204 controls an amount of ambient airflow 216 traveling to the radiator 80 and an amount of opening of the second group of grille shutters 206 controls an amount of ambient airflow traveling to the CAC 18. As such, the upper grille shutters may largely affect vehicle drag and engine cooling while the lower grille shutters affect CAC cooling.

In some examples, each group of grille shutters may contain the same number of grille shutters 114, while in other examples one group of grille shutters may contain more than the other. In one embodiment, the first group of grille shutters 204 may contain multiple grille shutters, while the second group of grille shutters 206 contains one grille shutter. In an alternate embodiment, the first group of grille shutters may only contain one grille shutter, while the second group of grille shutters contains multiple grille shutters.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an opened position and a closed position to provide airflow for cooling engine compartment components. An amount of opening of the grille shutters 114 or group of grille shutters (e.g., first group of grille shutters 204 or second group of grille shutters 206) may be denoted by a percentage. For example, when the grille shutters are halfway between an opened and closed position, the grille shutters may be 50% open. When the grille shutters are opened to an upper threshold amount (e.g., maximum amount of opening), the grille shutters may be 100% open.

The first group of grille shutters 204 (e.g., upper grille shutters) may be actuated by a motor 202. Motor 202 may be operatively coupled to the control system 28. As an example, controller 12 may be communicably connected to grille shutter system 110, and may have instructions stored thereon to adjust opening of grille shutters 114. Controller 12 may send signals for adjusting the grille shutter system 110 to motor 202. These signals may include commands to increase or decrease the opening of the upper grille shutters. For example, controller 12 may command the motor 202 to open the upper grille shutters to 30% open. Motor 202 is only connected to the upper grille shutters 204 and not to the second group of grille shutters 206 (e.g., lower shutters). The lower grille shutters are instead coupled through a linkage 208 to the upper grille shutters. Thus, movement of the upper grille shutters 204 may control movement of the lower grille shutters 206. Further details on this linkage mechanism are presented below with regard to FIG. 3.

FIG. 3 shows a schematic 300 of a dual grille shutter system, such as grille shutter system 110 shown in FIG. 2. The grille shutter system 110 has a first group of grille shutters 204 (e.g., upper grille shutters) positioned vertically above, with respect to a surface on which the vehicle 102 sits, a lower group of grille shutters 206 (e.g., lower grille shutters). Each group of grille shutters comprises one or more grille shutters 114. As shown in FIG. 3, upper grille shutters 204 and lower grille shutters 206 each include four individual grille shutters 114. In other embodiments, each group of grille shutters may have more or less than four grille shutters. In yet another embodiment, the first group of grille shutters 204 and the second group of grille shutters 206 may have an unequal number of grille shutters 114.

The grille shutters 114 in the first group of grille shutters 204 are coupled at one end to a first bracket 310. The grille shutters 114 in the second group of grille shutters 206 are coupled at one end to a second bracket 312. In one example, as shown in FIG. 3, the first bracket 310 has a slot 314 and the second bracket 312 has an actuating point 316. A linkage 208 is coupled at a first end to the slot 314 of the first bracket 310 and coupled at a second end to the actuating point 316 of the second bracket 312. In this way, the linkage 208 couples the lower grille shutters to the upper grille shutters.

The motor 202 receives signals from the controller 12 to actuate the first group of grille shutters 204. Specifically, the motor may move a position of the first bracket 310, thereby increasing or decreasing the opening of the first group of grille shutters 204. Once the first end of the linkage 208 reaches a bottom 320 of the slot 314, upward movement, with respect to the surface on which the vehicle sits, (in the direction shown by arrow 318) of the first bracket 314 causes upward movement of the second bracket 312 through the linkage 208. Upward movement of the second bracket 312 causes the second group of grille shutters 206 to move with the second bracket 312, thereby increasing the opening of the second group of grille shutters 206.

Schematic 300 shows four positions of the dual grille shutter system. In a first position 302, both the first group of grille shutters 204 and the second group of grille shutters 206 are closed (e.g., 0% open). As such, no ambient airflow may enter the vehicle through the grille shutters to cool the radiator and CAC. The first position 302 may be a base position for the grille shutter system.

Motor 202 may receive a command to increase the opening of the upper grille shutters from controller 12. In response, motor 202 may actuate the first bracket 310 to move upward in the direction shown by arrow 318. This adjustment may move the grille shutter system into a second position 304. In second position 304, the first group of grille shutters 204 is partially open (e.g., in an intermediate position between fully closed and fully opened). Thus, some ambient airflow may enter the vehicle through the opening of the first group of grille shutters and travel toward the radiator of the engine. The first end of linkage 208 is still above the bottom 320 of the slot 314. Thus, the second bracket 312 did not move position from first position 302 to second position 304 and the second group of grille shutters 206 remains closed.

Motor 202 may move the first bracket 310 further upward, in the direction shown by arrow 318, thereby moving the grille shutter system into a third position 306. In third position 306, the first group of grille shutters 204 is partially open with a grille shutter opening greater than the opening at the second position 304. The first end of linkage 208 is now at the bottom 320 of the slot 314. This causes the second bracket 312 to move upward with the first bracket 310. As the second bracket 312 moves upward, an opening of the second group of grille shutters increases. Therefore, in the third position 306, both the first group of grille shutters 204 and the second group of grille shutters 206 are partially open.

Controller 12 may send a command to the grille shutter system to open fully so maximal airflow may enter the engine. In response, motor 202 may move the grille shutter system into a fourth position 308. In fourth position 308, the first bracket 310 moves upward until the upper grille shutters are opened to an upper threshold level. In one example, the upper threshold level may be a maximal amount of opening. In the fourth position 308, the lower grille shutters are also opened to an upper threshold level. As such, both the upper and lower grille shutters may be 100% open in the fourth position 308.

In the first position 302, both the first group of grille shutters 204 and the second group of grille shutters 206 are 0% open (e.g., closed). In the second position 304, the second group of grille shutters 206 remains 0% open while the first group of grille shutters 204 is partially open. The first group of grille shutters 204 may be X % open at the point in which linkage 208 reaches the bottom 320 of the slot 314 and the second bracket 312 begins moving upward with the first bracket 310. As such, the first group of grille shutters may be open less than X % in the second position 304 and greater than X % in the third position 306. In this way, X % may be a threshold percentage at which the second group of grille shutters begins moving with the first group of grilles shutters. The second group of grille shutters is also partially open in the third position 306. In the fourth position 308, both the first group of grille shutters 204 and the second group of grille shutters 206 are 100% open.

The first position 302 and the second position 304 illustrate a first relationship between the first group of grille shutters and the second group of grille shutters. During the first relationship, the first group of grille shutters moves more than the second group of grille shutters. In one example, during the first relationship, an opening of the first group of grille shutters may increase while the second group of grille shutters remains closed (as shown in FIG. 3). In another example, during the first relationship, an opening of the first group of grille shutters may increase by a first amount while an opening of the second group of grille shutters increases by a second amount, the second amount smaller than the first amount. The first relationship may be further defined by an amount of opening of the first group of grille shutters and the second group of grille shutters. For example, during the first relationship, the first group of grille shutters may be open less than a first threshold amount of opening and the second group of grille shutters may be open less than a second threshold amount of opening. In this example, the second threshold amount is less than the first threshold amount.

The third position 306 and the fourth position 308 illustrate a second relationship between the first group of grille shutters and the second group of grille shutters. During the second relationship, the second group of grille shutters moves more than the first group of grille shutters. Moving the second group of grille shutters more than the first group of grille shutters may include opening the second group of grille shutters at a faster rate than the first group of grille shutters. For example, when the second group of grille shutters begins to open, the first group of grille shutters is already partially opened. Thus, in order for the first and second group of grille shutters to be 100% open together, the second group of grille shutters must open at a faster rate. Stated another way, during the second relationship, an amount of increase in opening of the second group of grille shutters may be greater than an amount of increase in opening of the first group of grille shutters. The rate of opening of the second group of grille shutters may be based on a position of the actuating point 316. For example, if the actuating point is moved closer to a pivot point of the grille shutters (e.g., where grille shutters 114 contact the second bracket 312) the rate of opening of the second group of grille shutters may increase. The second relationship may be further defined by an amount of opening of the first group of grille shutters and the second group of grille shutters. For example, during the second relationship, the first group of grille shutters may be opened at or greater than a first threshold amount of opening.

In this way, during a first relationship between a first group of grille shutters and a second group of grille shutters, the first group of grille shutters may be moved more than the second group of grille shutters. Alternatively, during a second relationship between the first group of grille shutters and the second group of grille shutters, the second group of grille shutters may be moved more than the first group of grille shutters. As described above, the first group of grille shutters controls airflow to a radiator and the second group of grille shutters controls airflow to a charge air cooler. The first group of grille shutters is positioned vertically above the second group of grille shutters and the second group of grille shutters is linked to the first group of grille shutters through a staged linkage. The first relationship includes when the first group of grille shutters is open less than a first threshold amount of opening and the second relationship includes when the first group of grille shutters is open at or greater than the first threshold amount of opening. Moving the first group of grille shutters more than the second group of grille shutters may include increasing an opening of the first group of grille shutters while the second group of grille shutters remains closed. Alternatively, moving the first group of grille shutters more than the second group of grille shutters may include increasing an opening of the first group of grille shutters by a first amount and increasing an opening of the second group of grille shutters by a second amount, the second amount smaller than the first amount. Moving the second group of grille shutters more than the first group of grille shutters may include opening the second group of grille shutters at a faster rate than the first group of grille shutters.

Further, FIG. 3 illustrates a first range of opening of the first group of grille shutters at the first portion 302 and the second position 304 and a second range of opening of the first group of grille shutters at the third position 306 and the fourth position 308. Over the first range of opening of the first group of grille shutters, only the first group of grille shutters may be adjusted while the second group of grille shutters are maintained closed. The first range of opening may be a range of opening between 0 and X %. Over a second range of opening of the first group of grille shutters, the first group of grille shutters and the second group of grille shutters may be proportionally adjusted. The second range of opening may be a range of opening between X % and 100%. In this way, X % may be a threshold percentage of opening of the first group of grille shutters which results in opening the second group of grille shutters and proportionally adjusting both groups of grille shutters together. Therefore, the first range of opening may be a range below the threshold percentage and the second range of opening may be a range at or above the threshold percentage. The threshold percentage may be based on the size and/or shape of the slot 320. For example, by increasing the length of the slot, the threshold percentage may increase. (Proportional adjustment based on position of the actuating point 316 on the second bracket 312 of the second group of grille shutters 206 and the size/shape of the slot 320 on the first bracket 310 of the first group of grille shutters 204).

In FIG. 3, the linkage is illustrated as a staged or slotted linkage with the slot coupled to the first group of grille shutters. In another example, another type of linkage may couple the first group of grille shutters to the second group of grille shutters and allow delayed opening and/or staged movement of the second group of grille shutters. In one example, the second group of grille shutters may have a slot while the first group of grille shutters has a single coupling point.

The system of FIGS. 1-3 may provide for a dual grille shutter system comprising a first group of grille shutters and a second group of grille shutters, the first group of grille shutters mechanically linked to the second group of grille shutters through a slotted linkage. Further, the system may comprise a single motor controlling actuation of the first group of grille shutters. A degree of opening of the first group of grille shutters may control a degree of opening of the second group of grille shutters. The first group of grille shutters and the second group of grille shutters may be located at a front end of a vehicle, the first group of grille shutters positioned vertically above, with respect to a surface on which the vehicle sits, the second group of grille shutters. The first group of grille shutters may be positioned in front of a radiator and the second group of grille shutters may be positioned in front of a CAC. The slotted linkage may include a linkage coupled at a first end to a slot, the slot coupled to the first group of grille shutters, and coupled at a second end to an actuating point, the actuating point coupled to the second group of grille shutters. Further, the second group of grille shutters may be disengaged from the first group of grille shutters when the first group of grille shutters is opened below a threshold percentage. Alternatively, the second group of grille shutters may be engaged, through the slotted linkage, to and move with the first group of grille shutters when the first group of grille shutters is opened at or above the threshold percentage.

As described above, the dual grille shutter system shown in FIGS. 1-3 may be actuated by a single motor which may be controlled by a controller. A controller may adjust the dual grille shutter system based on engine operating conditions. Engine operating conditions may include engine temperatures, CAC temperatures, pedal position (PP), throttle position, etc. In one example, the dual grille shutter system may be adjusted based on an engine temperature such as engine coolant temperature (ECT). For example, an engine temperature or engine coolant temperature greater than a first threshold temperature may indicate a need for increased engine cooling. As such, the controller may increase the opening of the upper grille shutters in response to an engine temperature greater than a first threshold temperature. By increasing the opening of the upper grille shutters (e.g., first group of grille shutters), more ambient airflow may reach the radiator and aid in engine cooling. Alternatively, if engine temperature is less than the first threshold temperature the upper grille shutters may remain closed. If the upper grille shutters are already open, the controller may close or decrease the opening of the upper grille shutters in response to an engine temperature less than the first threshold temperature. In another example, the upper grille shutters may close or remain closed in response to an engine coolant temperature smaller than the first threshold temperature.

The amount or degree of opening of the upper grille shutters in response to engine temperature may be based on additional engine operating conditions. For example, if the engine coolant temperature is greater than the first threshold temperature, the upper grille shutters may be opened to a first amount or percentage. This first percentage may increase for increasing engine coolant temperature. Additionally, this first percentage may be a percentage within a first range of opening (e.g., 0-X %). As such, the lower grille shutters may remain closed or open by a relatively small amount (e.g., less opening than the upper grille shutters). In this way, the opening of the upper grille shutters provides cooling to the radiator and engine while cooling to the CAC is reduced. This may reduce condensate formation in the CAC while still allowing cooling of other engine components. However, if the engine coolant temperature is greater than a second threshold temperature, the upper grille shutters may be opened past the threshold percentage. The second threshold temperature is greater than the first threshold temperature and may indicate an increased need for engine cooling. Thus, the controller may actuate the upper grille shutters to open between X % and 100% in response to engine coolant temperature greater than the second threshold temperature even if a CAC temperature is not greater than a threshold temperature (CAC threshold temperature described further below).

The dual grille shutter system may be further adjusted based on a CAC temperature. A CAC temperature may include one or more of a charge air temperature at the inlet or outlet of the CAC, and/or a dew point temperature of the CAC. For example, a CAC outlet temperature greater than a threshold temperature may indicate a need for increased cooling of the charge air. Thus, the controller may command the motor to increase the opening of the upper grille shutters such that the opening of the lower grille shutters is also increased in response to a CAC temperature greater than a threshold temperature. As described above, when the upper grille shutters are opened greater than a threshold percentage (e.g., X %), the lower grille shutters may also open. Thus, in order for the lower grille shutters to open and allow ambient air to travel to the CAC, the upper grille shutters must be actuated to open greater than the threshold percentage. In one example, if the threshold percentage is 50%, the upper grille shutters may be opened to 80% (e.g., something larger than 50%) to allow partial opening of the lower grille shutters. In this example, to allow even more CAC cooling, the upper grille shutters may be opened to 90% to allow further opening of the lower grille shutters. In this way, increasing the opening of the upper grille shutters also increases the opening of the lower grille shutters.

Alternatively, if the CAC temperature is not greater than the threshold temperature, the upper grille shutters may be maintained in the first range of opening so the lower grille shutters remain closed. Maintaining the lower grille shutters in a closed position may reduce ambient airflow to the CAC, thereby increasing CAC outlet temperature and reducing condensate formation. However, as discussed above, if engine temperature is greater than a second threshold temperature, the upper grille shutters may open to a level greater than the threshold percentage, thereby partially opening the lower grille shutters. Even under this condition, the staged or delayed opening of the lower grille shutters allows the lower grille shutters to be opened to a smaller percentage opening than the upper grille shutters (e.g., 30% vs. 70%), thereby reducing ambient airflow to the CAC.

The dual grille shutter system may be further adjusted based vehicle driving conditions, such as whether the vehicle is in a non-driven or wide open pedal (WOP) condition. For example, a driven condition may include when the wheels are applying positive force propelling the vehicle forward. The non-driven condition may include when the wheels are absorbing vehicle inertia and generating a negative force against forward vehicle motion. In one embodiment, the non-driven vehicle condition may include a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used to indicate a slower region ahead, a downgrade approaching, etc.

In some cases, during deceleration, the vehicle may be shut down and the transmission disconnected from the engine to improve fuel economy. In this situation, additional cooling of the engine is needed. Opening of the upper grille shutters at the beginning of deceleration in this case may allow for pre-cooling of the engine, keeping engine temperatures low. This may also allow the grille shutters to remain closed for a longer period during the following driven conditions, reducing vehicle drag and improving fuel economy. Thus, in response to a non-driven vehicle condition, the controller may actuate the upper grille shutters to open. In one example, this opening of the upper grille shutters may be with the first range of opening such that the lower grille shutters remain closed.

Pedal position may also be used to indicate a need for grille shutter adjustment. For example, a pedal position beyond a threshold position may indicate a wide open pedal (WOP) condition. Under this condition, peak engine power may be required, thereby requiring increased ambient airflow to the engine. Thus, in response to a pedal position greater than a threshold position, the controller may send a signal to the motor to open the first group of grille shutters to an upper threshold level. Opening the first group of grille shutters to the upper threshold level may also open the second group of grille shutters to the upper threshold level. As discussed above, the upper threshold level may be a maximal amount of opening (e.g., 100% open). As such, both the upper and lower grille shutters may be 100% open during a WOP condition.

In this way, vehicle grille shutters may be adjusted in response to engine operating conditions. Specifically, only a first group of grille shutters may be adjusted and a second group of grille shutters may be maintained closed over a first range of opening of the first group of grille shutters. In another example, the first group of grille shutters and the second group of grille shutters may be proportionally adjusted over a second range of opening of the first group of grille shutters. The first range of opening of the first group of grille shutters may include an amount of opening below a threshold percentage and the second range of opening may include an amount of opening at or above the threshold percentage. The threshold percentage may be based on a size of a slot of a slotted linkage between the first group of grille shutters and the second group of grille shutters. The first group of grille shutters may be adjusted with a motor operatively coupled to a control system while the second group of grille shutters is adjusted through a mechanical linkage between the first group of grille shutters and the second group of grille shutters. Adjusting only the first group of grille shutters and maintaining the second group of grille shutters closed may be in response to one or more of an engine temperature greater than a first threshold temperature and a non-driven vehicle condition, when a charge air cooler temperature is less than a threshold temperature. Proportionally adjusting the first group of grille shutters and the second group of grille shutters may be in response to one or more of an engine temperature greater than a first threshold temperature and/or a non-driven vehicle condition, when a charge air cooler temperature is greater than a threshold temperature and an engine temperature greater than a second threshold temperature when the charge air cooler temperature is not greater than the threshold temperature. Further, the first group of grille shutters and the second group of grille shutters may be opened to an upper threshold level in response to a pedal position beyond a threshold position.

FIG. 4 illustrates an example of a method 400 for adjusting a dual grille shutter system in response to engine operating conditions. A controller, such as controller 12 shown in FIG. 1, may have instructions stored thereon for executing method 400. Method 400 begins a 402 by estimating and or measuring engine operating conditions. Engine operating conditions may include engine speed and load, vehicle speed, pedal position (PP), CAC temperature (e.g., charge air temperature at CAC outlet), engine temperature (e.g., engine coolant temperature), throttle position, grille shutter position, etc. At 404, the method includes determining if engine temperature is greater than a first threshold temperature, T1. In one example, engine temperature may be an engine coolant temperature. If engine temperature is not greater than the first threshold temperature T1, the method continues on to 406 to determine if there is a non-driven vehicle condition. As described above, a non-driven vehicle conditions may include a braking or deceleration condition. As such, this condition may be denoted by a decrease in pedal position or vehicle speed. If there is a non-driven vehicle condition at 406, the controller may actuate the upper grille shutters (GS) to open between 0 and X % at 414. As discussed above, X % may be a threshold percentage of opening of the upper grille shutters. If the upper grille shutters are opened above this threshold percentage, the lower grille shutters may begin to open or increase opening. Thus, in response to the upper grille shutters opening to a level below the threshold percentage, the lower grille shutters (GS) may remain closed at 416. In another example, the lower grille shutters may open by an amount smaller than the amount of opening of the upper grille shutters. This smaller amount may be an opening that only allows a small amount of ambient air to enter the vehicle through the lower grille shutters.

Returning to 406, if there is not a non-driven vehicle condition, the method continues on to 408 to determine if the pedal position is greater than a threshold position. If pedal position is not greater than the threshold position, the method continues on to 412. If the grille shutter system is in the base position (e.g., both upper and lower grille shutters closed), the upper and lower grille shutters are maintained closed. Alternatively, if the grille shutter system is in another position, the upper and lower grille shutters are maintained in their current positions.

However, if pedal position is greater than the threshold position at 408, the controller actuates the upper grille shutters to open 100% (e.g., completely open) at 410. Opening the upper grille shutters to 100% open causes the lower grille shutters to open to 100% at 444. In an alternate example, in response to a pedal position greater than a threshold position, the upper and lower grille shutters may open to a percentage less than 100%. In one example, the upper and lower grille shutters may open to 95% open. This percentage opening may be based on the pedal position and torque demand of the engine.

Returning to 404, if engine temperature is not greater than the first threshold temperature T1, the controller may actuate the upper grille shutters (GS) to open between 0 and X % at 414. In response to the upper grille shutters opening to a level below the threshold percentage (X %), the lower grille shutters (GS) may remain closed at 416. The method continues on to 418 to determine if CAC temperature is greater than a threshold temperature, T3. In one example, CAC temperature may be a temperature of the charge air exiting the CAC and entering the intake of the engine. If CAC temperature is greater than the threshold temperature T3, the upper grille shutters are opened to an amount above the threshold percentage (e.g., between X % and 100%) at 424. In response to the upper grille shutters opening to a level between X % and 100%, the lower grille shutters open partially at 426. As described above, this is due to the lower grille shutters engaging with the upper grille shutters, through the linkage, when the upper grille shutters open to an amount above the threshold percentage. As such, ambient air may now flow through both the upper and lower grille shutters.

Alternatively, if CAC temperature is not greater than the threshold temperature T3, the method continues on to 420 to determine if engine temperature is greater than a second threshold temperature, T2. The second threshold temperature T2 is greater than the first threshold temperature T1. As such, the second threshold temperature T2 may indicate a need for increased engine cooling, thereby requiring increased ambient airflow. If the engine temperature is greater than the second threshold temperature T2, the method continues on to 424 to open the upper grille shutters between X % and 100%. In one example, the upper grille shutters may open to a level closer to 100% if the engine temperature is a larger amount above the second threshold temperature T2. In another example, the upper grille shutters may open to a level closer to X % if the engine temperature is a smaller amount above the second threshold temperature T2. In response to the upper grille shutters opening to a level between X % and 100%, the lower grille shutters open partially at 426. The amount of opening of the lower grille shutters at 426 may be based on the amount of opening of the upper grille shutters, a position of the actuating point on the lower grille shutters, and a size of the slot on the upper grille shutters. For example, the lower grille shutters may open to a higher percentage of opening for an increasing percentage of opening of the upper grille shutters. In another example, the lower grille shutters may open by a larger amount if the actuating point is closer to the pivot point of the lower grille shutters. Returning to 420, if the engine temperature is not greater than the second threshold temperature T2, the controller may maintain the upper grille shutters between 0 and X % at 422, thereby maintaining the lower grille shutters in a closed position.

At 428, the method determines if pedal position is greater than a threshold position. If pedal position is not greater than the threshold position, the upper grille shutters are maintained in an opening range between X % and 100% at 430. Thus, the lower grille shutters are also maintained in their current position. Alternatively, if pedal position is greater than the threshold position (e.g., WOP condition), the controller may actuate the motor of the grille shutter system to open the upper grille shutters to 100% at 432. As a result of opening the upper grille shutters to 100% open, the lower grille shutters open to 100% as 434. At 436, the method determines if pedal position is less than the threshold position (e.g., WOP condition has ended). If pedal position is not less than the threshold position, the upper and lower grille shutters positions are maintained at 438. However, if pedal position is less than the threshold position at 436, the upper grille shutters are closed at 440. As a result, the lower grille shutters also closed at 442. Thus, the upper and lower grille shutters may return to their base positions.

Figure 5:
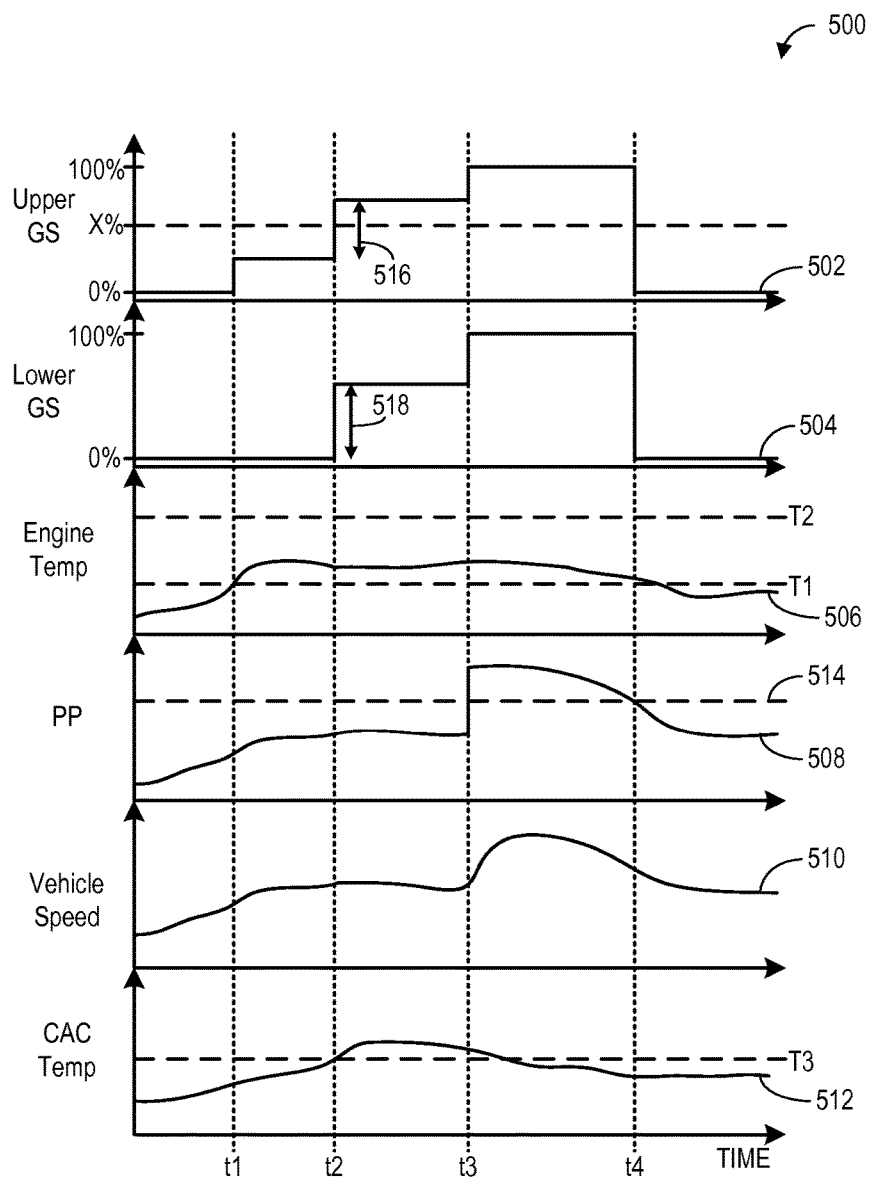
FIG. 5 shows an example graph illustrating adjustments to a grille shutter system based on engine operating conditions.

FIG. 5 shows an example graph 500 illustrating adjustments to a grille shutter system based on engine operating conditions. Specifically, graph 500 displays changes in upper grille shutter position at plot 502, changes in lower grille shutter position at plot 504, changes in engine temperature at plot 506, changes is pedal position (PP) at plot 508, changes in vehicle speed at plot 510, and changes in CAC temperature at plot 512. Upper and lower grille shutter positions are shown as percentages at plots 502 and 504, respectively. The percentages reflect a percentage of opening wherein 0% is no opening (e.g., closed position) and 100% is a fully open position.

Before time t1 the upper and lower grille shutters are in a closed position such that little to no ambient air may enter the vehicle through the grille shutters (plots 502 and 504). Engine temperature is below a first threshold temperature T1 (plot 506), pedal position is below a threshold position 514 (plot 508), and CAC temperature is less than a threshold temperature T3 (plot 512). At time t1, engine temperature increases above the first threshold temperature T1 while CAC temperature remains below the threshold temperature T3. In response, the controller actuates the upper grille shutters to open to an amount below a threshold percentage, X % (e.g., opens between 0 and X %). As a result, the lower grille shutters remain closed (plot 504).

At time t2, CAC temperature increases above the threshold temperature T3 (plot 512) while engine coolant temperature is still above the first threshold temperature T1 (plot 506). As a result, the upper grille shutters open to a position greater than the threshold percentage X %. As a result, the lower grille shutters open by a first amount 518. First amount 518 is greater than a second amount 516 of opening of the upper grille shutters. At time t3, pedal position increases above the threshold position 514 (plot 508), thereby increasing vehicle speed (plot 510). This may indicate a WOP condition. In response to pedal position beyond the threshold position 514, the upper grille shutters are adjusted by the motor to 100% open (plot 502). As a result, the lower grille shutters also open to 100% open (plot 504). At time t4, pedal position decreases below the threshold position 514, indicating the end of the WOP condition. As a result, the upper and lower grille shutters are returned to a base, closed position (plots 502 and 504).

In one example, as shown at time t1, in response to an engine temperature below a first threshold temperature when a CAC temperature is less than a threshold temperature, only the first group of grille shutters (e.g., upper grille shutters) are adjusted while the second group of grille shutters (e.g., lower grille shutters) are maintained in a closed position. In another example, as shown at time t2, in response to an engine temperature greater than a first threshold temperature when a CAC temperature is greater than a threshold temperature, the first group of grille shutters and the second group of grille shutters are proportionally adjusted. This proportional adjustment included increasing the opening of the second group of grille shutters by a greater amount than the first group of grille shutters (e.g., moving the second group of grille shutters more than the first group of grille shutters). Finally, as shown at time t3, the first group of grille shutters and the second group of grille shutters are opened to an upper threshold level (e.g., 100%) in response to a pedal position beyond a threshold position.

In this way, a first group of grille shutters and a second group of grille shutters of a vehicle may be adjusted by a single motor based on engine operating conditions. The first group of grille shutters may control ambient airflow to a radiator while the second group of grille shutters controls ambient airflow to a CAC. The first group of grille shutters may be coupled through a staged linkage to the second group of grille shutters. The motor may control a position of the first group of grille shutters while the position of the first group of grille shutters controls a position of the second group of grille shutters. When the position of the first group of grille shutters is within a first range of opening, the second group of grille shutters may remain closed. Alternatively, when the position of the first group of grille shutters is within a second range of opening, the second range greater than the first range, the second group of grille shutters adjusts proportionally with the first group of grille shutters. The range of opening of the first group of grille shutters may be based on engine operating conditions such as engine temperature, CAC temperature, and driving conditions. As such, the first and second group of grille shutters may be adjusted to increase engine cooling while decreasing ambient airflow to the CAC, thereby decreasing condensate formation and reducing the likelihood of engine misfire.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for controlling vehicle grille shutters, comprising:
   adjusting only a first group of grille shutters and maintaining a second group of grille shutters closed over a first range of openings of the first group of grille shutters in response to a non-driven vehicle condition; and
   proportionally adjusting the first group of grille shutters and the second group of grille shutters together over a second range of openings of the first group of grille shutters, where the first and second groups of grille shutters are positionable in each of a first position with both the first group of grille shutters and the second group of grille shutters closed, a second position with the first group of grille shutters partially open and the second group of grille shutters closed, a third position with both the first group of grille shutters and the second group of grille shutters partially open where the first group of grille shutters is partially open with a grille shutter opening greater than at the second position, and a fourth position with both the first group and the second group of grille shutters fully open.

2. An engine method, comprising:
   during a first relationship between a first group of grille shutters and a second group of grille shutters, moving the first group of grille shutters more than the second group of grille shutters in response to a non-driven vehicle condition; and
   during a second relationship between the first group of grille shutters and the second group of grille shutters, moving the second group of grille shutters more than the first group of grille shutters, wherein the moving the first group of grille shutters more than the second group of grille shutters includes increasing an opening of the first group of grille shutters through a range of openings while the second group of grille shutters remains closed.

3. The method of claim 2, wherein the first group of grille shutters controls airflow to a radiator and the second group of grille shutters controls airflow to a charge air cooler, and wherein the first group of grille shutters is positioned vertically above, with respect to a surface on which a vehicle in which the engine is installed sits, the second group of grille shutters.

4. The method of claim 3, wherein the second group of grille shutters is linked to the first group of grille shutters through a staged linkage, and wherein during the second relationship, both the first and second groups of grille shutters open further including both being fully open at a common position.

5. The method of claim 2, wherein the first relationship includes when the first group of grille shutters is open less than a first threshold amount of opening and the second relationship includes when the first group of grille shutters is open at or greater than the first threshold amount of opening.

6. The method of claim 2, wherein during the first relationship, the adjustment includes moving from a condition with both the first group of grille shutters and the second group of grille shutters closed.

7. The method of claim 2, wherein the moving the second group of grille shutters more than the first group of grille shutters includes increasing an opening of the second group of grille shutters by a first amount and increasing an opening of the first group of grille shutters by a second amount, the second amount smaller than the first amount.

8. A system for controlling a dual grille shutter system, comprising:
   a first group of grille shutters and a second group of grille shutters, the first group of grille shutters mechanically linked to the second group of grille shutters through a slotted linkage; and
   a single motor controlling actuation of the first group of grille shutters, wherein the first group of grille shutters and the second group of grille shutters are located at a front end of a vehicle, the first group of grille shutters positioned vertically above, with respect to a surface on which the vehicle sits, the second group of grille shutters, and wherein the first group of grille shutters is positioned in front of a radiator and the second group of grille shutters is positioned in front of a charge air cooler;
   a turbocharged engine with the charge air cooler positioned downstream of a compressor and upstream of a throttle; and
   a controller with instructions stored in memory to adjust the single motor responsive to charge air cooler tem perature, non-driven vehicle operating conditions, and pedal position, the instructions further including:
in response to each of: engine temperature above a first threshold temperature, and non-driven vehicle conditions and engine temperature below the first threshold temperature, adjusting the first group of grille shutters between closed and partially open, but not fully open, and maintaining the second group closed;
in response to each of charge air cooler temperature above a third threshold, and engine temperature above a second threshold with charge air cooler temperature below the third threshold, adjusting the first group of grille shutters between closed and fully open and opening the second group partially; and
in response to pedal position greater than a pedal threshold, opening both the first and second groups fully.

9. A system for controlling a dual grille shutter system, comprising:
a first group of grille shutters and a second group of grille shutters, the first group of grille shutters mechanically linked to the second group of grille shutters through a slotted linkage;
a single motor controlling actuation of the first group of grille shutters, wherein the first group of grille shutters and the second group of grille shutters are located at a front end of a vehicle, the first group of grille shutters positioned vertically above, with respect to a surface on which the vehicle sits, the second group of grille shutters, and wherein the first group of grille shutters is positioned in front of a radiator and the second group of grille shutters is positioned in front of a charge air cooler; and
a controller with instructions stored in memory to adjust the single motor responsive to charge air cooler temperature, non-driven vehicle operating conditions, and pedal position, wherein the slotted linkage includes a linkage coupled at a first end to a slot, the slot coupled to the first group of grille shutters, and coupled at a second end to an actuating point, the actuating point coupled to the second group of grille shutters.

10. The system of claim 9, wherein the second group of grille shutters is disengaged from the first group of grille shutters when the first group of grille shutters is opened below a threshold percentage and the second group of grille shutters is engaged, through the slotted linkage, to and moves with the first group of grille shutters when the first group of grille shutters is opened at or above the threshold percentage.

11. The method of claim 1, wherein adjusting only the first group of grille shutters and maintaining the second group of grille shutters closed is in response to charge air cooler temperature less than a threshold, and proportionally adjusting the first group of grille shutters and the second group of grille shutters is in response to charge air cooler temperature greater than the threshold.

12. The method of claim 11, wherein the first group of grille shutters and the second group of grille shutters are located at a front end of a vehicle and wherein the first group of grille shutters is positioned in front of a radiator and the second group of grille shutters is positioned in front of a charge air cooler.

13. The method of claim 12, wherein the first group of grille shutters is further positioned vertically above, with respect to a surface on which the vehicle sits, the second group of grille shutters, and wherein during the proportional adjusting, as the first group of grille shutters opens, the second group of grille shutters also opens.

14. The method of claim 13, further comprising adjusting the first group of grille shutters with a motor operatively coupled to a control system and adjusting the second group of grille shutters through a mechanical linkage between the first group of grille shutters and the second group of grille shutters, wherein the second range of openings are greater openings than the first range of openings.

15. The method of claim 12, wherein the adjusting only the first group of grille shutters and maintaining the second group of grille shutters closed is further in response to an engine temperature greater than a first threshold temperature when the charge air cooler temperature is less than the threshold.

16. The method of claim 15, wherein the proportionally adjusting the first group of grille shutters and the second group of grille shutters is in response to one or more of the engine temperature greater than the first threshold temperature and/or the non-driven vehicle condition, when the charge air cooler temperature is greater than the threshold and an engine temperature greater than a second threshold temperature when the charge air cooler temperature is not greater than the threshold.

17. The method of claim 12, further comprising opening the first group of grille shutters and the second group of grille shutters to an upper threshold level in response to a pedal position beyond a threshold position.

18. The method of claim 11, wherein the first range of openings of the first group of grille shutters includes an amount of opening below a threshold percentage and the second range of openings includes an amount of opening at or above the threshold percentage, and wherein the first range of openings of the first group of grille shutters further includes each of the first group of grille shutters being closed, the first group of grille shutters being at least partially opened, and the first group of grille shutters being opened further than at least partially opened.

19. The method of claim 18, wherein the threshold percentage is based on a size of a slot of a slotted linkage between the first group of grille shutters and the second group of grille shutters.

* * * * *